United States Patent [19]
Converse et al.

[11] 4,390,828
[45] Jun. 28, 1983

[54] BATTERY CHARGER CIRCUIT

[75] Inventors: Merle E. Converse, Helotes; Glenn T. Darilek, San Antonio, both of Tex.

[73] Assignee: Transaction Control Industries, Bryan, Tex.

[21] Appl. No.: 359,021

[22] Filed: Mar. 17, 1982

[51] Int. Cl.³ .............................................. H02J 7/04
[52] U.S. Cl. ...................................... 320/32; 323/278
[58] Field of Search .................................. 320/31–36, 320/39, 40, DIG. 1; 323/278

[56] References Cited
U.S. PATENT DOCUMENTS

| | | | |
|---|---|---|---|
| 3,078,410 | 2/1963 | Thomas | 323/278 |
| 3,517,295 | 6/1970 | Lapuyade | 320/32 |
| 3,889,171 | 6/1975 | Hunter, Jr. | 320/35 X |
| 4,105,962 | 8/1978 | Scott, Jr. et al. | 320/32 |
| 4,316,133 | 2/1982 | Locke, Jr. | 320/35 X |

Primary Examiner—William M. Shoop
Attorney, Agent, or Firm—Gale R. Peterson

[57] ABSTRACT

A battery charger circuit having a temperature-dependent constant voltage region, a constant current region, and a power dissipation limiting current "foldback" region.

7 Claims, 2 Drawing Figures

BATTERY CHARGER CIRCUIT

CROSS-REFERENCE TO RELATED APPLICATIONS

The battery charger of the present invention is useful as a general purpose lead-acid cell battery charger, and is particularly useful with the battery control circuit described in co-pending U.S. Application Ser. No. 359,023, filed Mar. 17, 1982, and assigned to the Assignee of the present invention.

BACKGROUND OF THE INVENTION

This invention relates to battery chargers and in particular to battery charger circuits for lead-acid cell batteries. Various charging modes for battery chargers are known in the prior art. In the constant current mode, for example, a constant current level is passed through the battery cells either for a fixed time or until the battery is determined to be fully charged. A variation of the constant current mode is to pass a large current through the battery until the battery reaches a predetermined state of charge, and then reduce the current level for completing the charge. A third mode is the decreasing current charge rate mode in which the charging current is continuously reduced from a large initial value toward zero in proportion to the remaining amount of charge to be stored. In the constant potential mode, a fixed potential is applied across the battery and held until charge is completed. Current limiting means must, however, be used to prevent an excessive initial surge of current into a fully discharged battery. Such an initial current surge could harm battery cells and also the series controlling element of the charger.

Most prior art battery chargers are pre-set for a nominal room temperature of approximately 75° F. for charging purposes, however, batteries generally require a higher charging voltage in cold temperatures than in warm temperatures.

Prior art battery chargers also generally require a relatively constant input voltage to limit dissipation in the series controlling element of the charger.

SUMMARY OF THE INVENTION

The present invention provides for a fully flexible and variant battery charger which adjusts automatically to the charging mode and the voltage required.

The battery charger of the present invention automatically provides the most expedient charging mode, by providing a constant voltage region, a constant current region, and a current "foldback" region in which the charging current into a discharged battery is continuously increased from a small initial value toward maximum current dependent upon the difference between the input voltage and the battery voltage.

The battery charger of the present invention also allows for an automatic variation of charging voltage depending on ambient temperature. That is, the battery charger of the present invention varies the charging voltage in inverse proportion to varying ambient temperatures.

Therefore, as will be seen from the following detailed description, the battery charger of the present invention automatically senses ambient temperature and selects an appropriate output charging voltage depending on ambient temperatures, and also automatically selects the charging mode and varies that charging mode depending on the charge state of the battery.

It is therefore a primary object of the present invention to provide a fully flexible variant battery charger which automatically adjusts charging voltage to ambient temperature, automatically adjusts the charging mode required depending upon the charge state of the battery, and limits power dissipation in the series controlling element of the charger.

It is a further object of the present invention to provide a battery charger having a varying charging voltage depending upon ambient temperature.

It is a further object of the present invention to provide a battery charger having a constant voltage region, a constant current region, and a power dissipation limiting current "foldback" region.

Other objects, features, and advantages of the invention will become evident in light of the following detailed description considered in conjunction with the referenced drawing of a preferred exemplary battery charger according to the present invention.

DETAILED DESCRIPTION OF THE INVENTION

Figure 1:
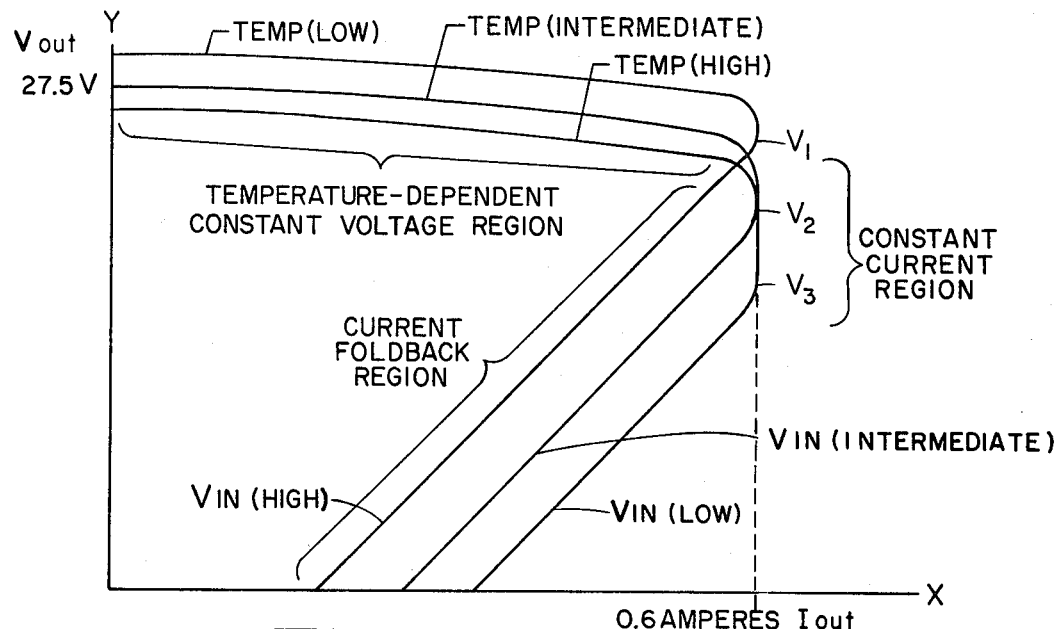
FIG. 1 is a voltage-current diagram showing the temperature-dependent constant voltage region, constant current region, and current "foldback" region of the battery charger circuit of the present invention.

Referring to FIG. 1, the battery charger voltage output is shown on the Y axis and the battery charger output current is shown on the X axis. As shown in FIG. 1, there is a power dissipation limiting current "foldback" region which limits the charging current into a fully discharged battery to a safe level. That safe level is dependent upon the battery charger input voltage $V_{IN}$, therefore the foldback current magnitude is lower when $V_{IN}$ (the battery charger input voltage) is high and vice-versa. When the battery charges to a level $V_1$, $V_2$, or $V_3$, again depending upon the input voltage to the battery charger, the battery charger of the present invention operates in a constant current region. In that region, current is limited to a predetermined current level, for example 0.6 amperes.

As the battery charges further, and the battery voltage increases, the battery charger of the present invention operates in a temperature-dependent constant voltage region. That relatively constant charging voltage region, running along the upper portion of the diagram, limits the charging voltage to some predetermined voltage level which varies with temperature, for example 27.5 volts at intermediate temperatures. In the temperature-dependent constant voltage region, the charging current decreases to near zero (0) amperes when the battery is fully charged.

Figure 2:
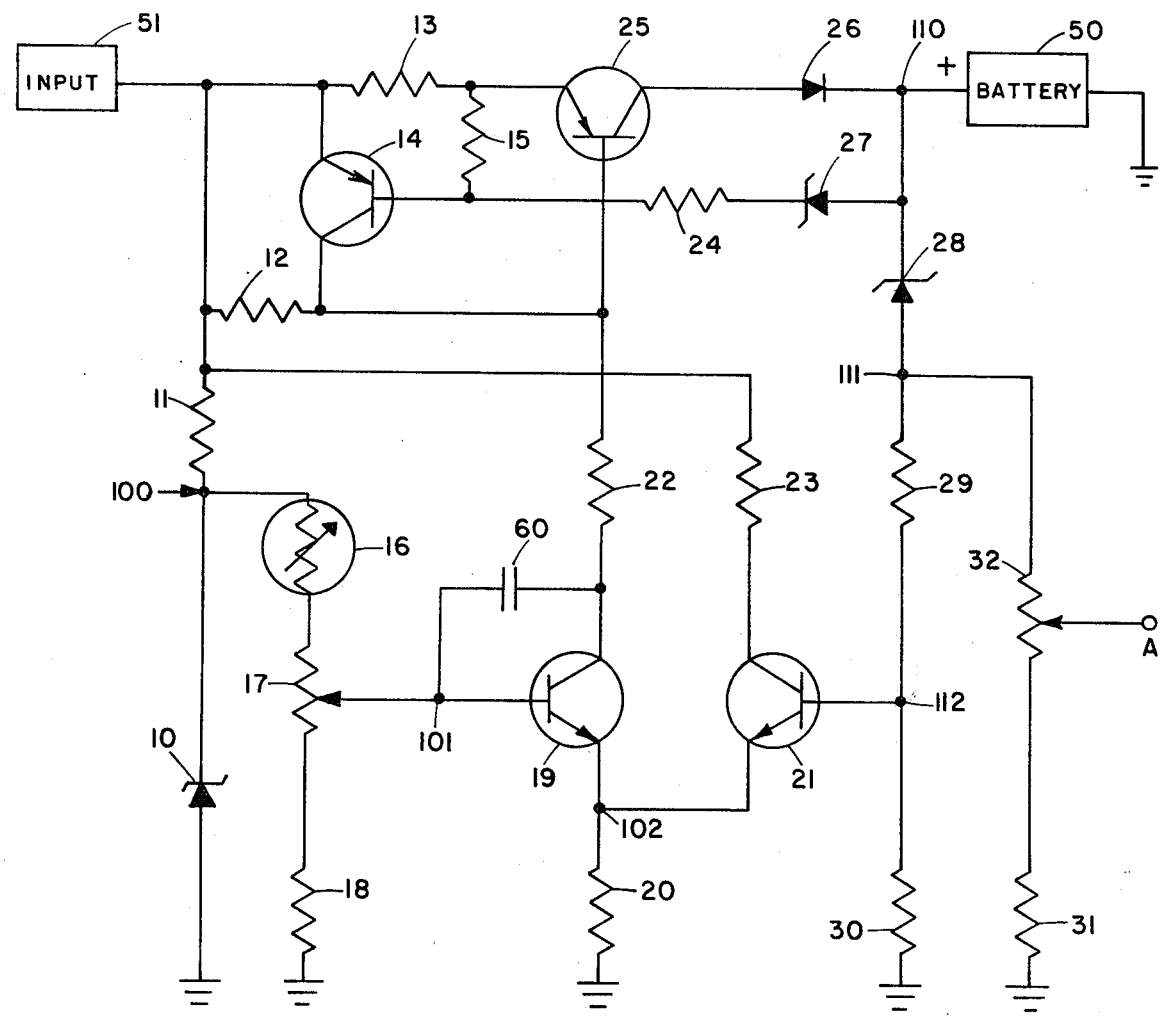
FIG. 2 is a detailed circuit diagram for the battery charger of the present invention.

If the battery is fully discharged ("dead"), a full voltage appears across output transistor 25 (see FIG. 2). At full current (that is, if the battery was fully discharged), the current through transistor 25 would exceed its current rating and destroy the transistor. The battery charger of the present invention provides a current limiting circuit for the foldback portion; that is, when a discharged battery is to be charged, the battery charger of the present invention holds the current output at some point below the maximum possible current output to limit power dissipation in the series controlling element of the charger, in this case transistor 25.

Referring to FIG. 2, an unregulated source of charging potential is input to the charging circuit at 51. If a battery to be charged 50 is, for example, a nominal 27-volt battery, the input could be, for example, 30 to 40 volts D.C. If the battery, of course, had some other nominal voltage, the input would vary accordingly.

Charging potential from input 51 is taken through a resistor 11 to a zerer diode 10 and to ground. Zener diode 10 maintains a constant voltage at node 100. The constant voltage at node 100 is connected through a positive temperature coefficient resistor 16 through variable resistor 17 and a resistor 18 to ground. The resistance of resistor 16 varies with ambient temperature. Resistor 16, resistor 17, and resistor 18 form a voltage divider network. The voltage at node 101 is therefore temperature compensated by resistor 16. That voltage is applied to the base of transistor 19.

Transistors 19 and 21 form a differential amplifier. The voltage at node 101 sets up an emitter voltage at node 102. The other input to the differential amplifier, applied to the base of transistor 21, varies with the battery 50 voltage as hereinafter described. Resistor 20, connected between the emitter of transistor 19 and ground, determines the current flow through the differential amplifier. Capacitor 60, connected between the base and collector of transistor 19, is a loop compensation capacitor for preventing any oscillation in the amplifier.

The battery voltage of battery 50, appearing at node 110, is dropped a fixed amount by zener diode 28 and the voltage at node 111 is divided by resistors 29 and 30, and applied to the base of transistor 21. Therefore, there is a voltage varying with temperature at node 101 as one input to the differential amplifier, and a voltage representing the potential on battery 50 at node 112 as the other input to the differential amplifier. The collector of transistor 21 is connected through current limiting resistor 23 to input 51. The collector of transistor 19 is connected through current limiting resistor 22 to the series controlling element, in this case the base of transistor 25.

As is apparent, if the voltage at node 112 is low with respect to the voltage at node 101, the conductivity of transistor 19 increases thereby also increasing the conductivity of transistor 25. If the voltage at node 112 is high with respect to the voltage at node 101, the conductivity of transistor 19 will decrease and correspondingly the conductivity of transistor 25 will decrease. Therefore, the charging voltage level will be automatically adjusted for ambient temperatures and the stored charge or potential in battery 50. Variable resistor 17 may be used to manually adjust the maximum voltage output of the battery charger, that is the maximum input charging voltage to battery 50.

Input from 51 is also applied to the emitter of transistor 14 and through bias resister 12 to the collector of transistor 14, and through resistor 13 to the emitter of transistor 25. The base of transistor 14 is connected through resistor 15 to the emitter of transistor 25 and through resistor 24 and zener diode 27 to battery 50. A diode 26 is connected between the positive terminal of battery 50 and the collector of transistor 25 to prevent battery discharge through the battery charger circuit when there is no input to battery 50.

Transistor 14 allows the battery charger circuit of the present invention to operate in the constant current and "foldback" regions as follows.

The constant current region (see FIG. 1) is reached when the charging current produces a 0.6 volt drop across resistor 13. That will cause transistor 14 to begin conducting thereby causing the conductivity of transistor 25 to decrease. Therefore, as long as there is a 0.6 volt drop across resistor 13, transistor 14 will maintain current at a constant level. As the battery voltage decreases to the input voltage at 51 minus 0.6 volts minus zener diode 27 voltage, the voltage on the base of transistor 14 is decreased even more thereby causing the conductivity of transistor 25 to decrease even more. As the base of transistor 14 is pulled lower, the conductivity of transistor 14, of course, is increased.

The current foldback point $V_1$, $V_2$, and $V_3$ on FIG. 1 will vary depending on the input voltage. Letting $V_O$ equal battery 50 output voltage; $V_{IN}$ equal input voltage at 51; and, $V_{z27}$ equal zener diode 27 voltage when the battery charger of the present invention is in the foldback region, the output voltage is determined by the equation:

$$V_O = V_{IN} - 0.6 - V_{z27}$$

Therefore, power dissipation in transistor 25 is limited. If the input voltage $V_{IN}$ is low, the current foldback will occur at a lower voltage and vice-versa. For the same reason, the short circuit current that occurs at the intersection of the current-voltage line with the base line on FIG. 1, is less for higher input voltages and vice-versa.

Because the voltage at node 111 is representative of the voltage on battery 50, a tap-off may be taken at that point and applied to the input of the battery control circuit described in related patent application Ser. No. 359,023, filed Mar. 17, 1982, assigned to the Assignee of the present invention. Variable resistor 32 and resistor 31 form a voltage divider network for adjusting the input voltage to that battery control circuit. Output A may be used to make the connection.

Thus the battery charger circuit of the present invention provides a completely variable battery charger in which charging voltage may be adjusted and is automatically temperature compensated depending on ambient temperature. Moreover, the battery charger of the present invention provides a charger which automatically varies the charging mode from increasing current and voltage to constant current, to constant voltage automatically depending on the charge state of the battery.

Although the invention has been described in conjunction with the foregoing specific embodiment, many alternatives, variations and modifications are apparent to those of ordinary skill in the art. Those alternatives, variations and modifications are intended to fall within the spirit and scope of the appended claims.

We claim:

1. A battery charger comprising:
   means for generating a charging voltage and current;
   means for electrically connecting said means for generating a charging voltage and current to a battery;
   means for sensing the charge state of said battery; and,
   means responsive to the charge state of said battery for increasing the charging voltage and current from an initial level to a relatively constant current level to a relatively constant voltage level wherein the current is reduced from the constant current level to zero in proportion to the amount of charge stored in said battery.

2. A battery charger as set forth in claim 1 further comprising:
   means for sensing ambient temperature; and
   means operatively connected to said means for sensing ambient temperature for varying said charging voltage in response to changing ambient temperatures.

3. A battery charger comprising:
   a source of unregulated charging potential;
   temperature sensing means for sensing ambient temperature;
   controlling element means for controlling the level of said charging potential input to a battery, operatively connected between said source of unregulated charging potential and a battery to be charged;
   current limiting means operatively connected between said source of unregulated charging potential and said battery for limiting current flow through said controlling element to a predetermined value; and
   circuit means operatively connecting said means for sensing ambient temperature to said controlling element means and operably connected to said current limiting means for causing said controlling element means to adjust the level of said charging potential and for causing said current limiting means to adjust the level of charging current for ambient temperature.

4. A battery charger as set forth in claim 3 further comprising:
   potential sensing means for sensing the potential stored by said battery operatively connected to said circuit means; and
   means operatively connected to said potential sensing means and said temperature sensing means for adjusting the level of said charging potential in response to the potential stored in said battery.

5. A battery charger as set forth in claim 4 wherein said potential sensing means, said circuit means and said current limiting means are operatively connected whereby charging potential and current output to said battery increase from an initial level to a relatively constant current level determined by said current limiting means to a relatively constant potential level wherein current is reduced from said constant current level to zero as the charge stored in said battery increases.

6. A battery charger comprising: a source of unregulated charging potential;
   controlling element means for controlling the level of said charging potential operatively connected between said source of unregulated charging potential and a battery to be charged;
   comparator means having at least first and second inputs and an output for comparing the levels of said source of charging potential and the potential stored in said battery and for controlling said controlling element means;
   means for operatively connecting said first input of said comparator means to said source of unregulated charging potential;
   means for operatively connecting said second input of said comparator means to said battery;
   means for connecting the output of said comparator to said controlling element means;
   ambient temperature sensing means operatively connected between said source of charging potential and said first input of said comparator, whereby the controlling element means varies the level of charging potential applied to said battery in response to the difference between the level of said source of charging potential and the level of said battery potential, and in response to ambient temperature;
   current limiting means operatively connected between said source of charging potential and said battery, and operatively connected to said controlling element whereby said current limiting means limits current flow through said controlling element to a predetermined value; and
   means operatively connecting said current limiting means to said comparator means whereby charging voltage and current are increased from an initial level to a relatively constant current level to a relatively constant voltage level wherein the current is reduced from the constant current level to zero in proportion to the amount of charge stored in said battery.

7. A battery charger as set forth in claim 6 wherein said comparator means comprises a differential amplifier.

* * * * *